United States Patent [19]

Carder et al.

[11] 4,304,518
[45] Dec. 8, 1981

[54] AIRCRAFT LOADER

[75] Inventors: Victor H. Carder, Salinas, Calif.; Robert C. Wareham, Peachtree City, Ga.

[73] Assignee: Cochran Airport Systems, Castroville, Calif.

[21] Appl. No.: 110,086

[22] Filed: Jan. 7, 1980

[51] Int. Cl.³ .............................................. B60P 1/02
[52] U.S. Cl. .................................... 414/495; 14/71.3
[58] Field of Search ............... 414/340, 343, 349, 352, 414/353, 373, 390–392, 396, 398, 399, 401, 495, 584; 244/137 R; 187/35, 36; 14/71.1, 71.3, 71.7, 72.5

[56] References Cited

U.S. PATENT DOCUMENTS

| | | | |
|---|---|---|---|
| 2,489,869 | 11/1949 | Dunn | 414/584 |
| 3,305,110 | 2/1967 | Tantlinger | 244/137 R X |
| 3,489,300 | 1/1970 | McCartney et al. | 414/343 |
| 3,687,321 | 8/1972 | Goodhart et al. | 414/495 |
| 4,010,826 | 3/1977 | Jones | 414/495 |

Primary Examiner—Robert W. Saifer
Attorney, Agent, or Firm—Naylor, Neal & Uilkema

[57] ABSTRACT

An aircraft loader having bridge and main elevators is provided with pivotally mounted trays at the rearward end of the bridge elevator. The trays serve as transit means for the passage of load units between the two elevators both when the two elevators are level and when they are out of level to a degree. The trays function also as part of a level control system whereby the levels of the main elevator and trays tend to be adjusted to match the level of the bridge elevator.

4 Claims, 10 Drawing Figures

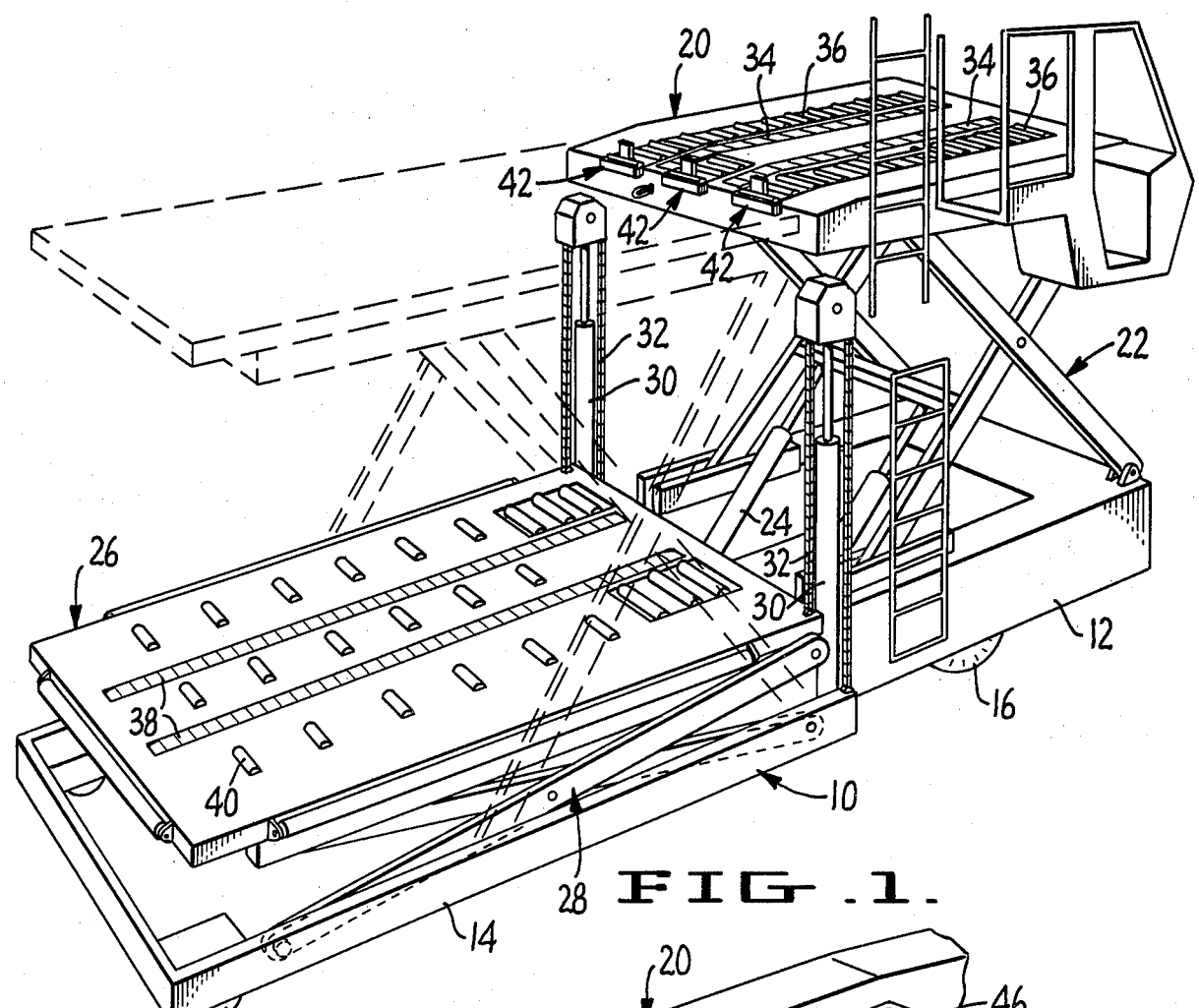
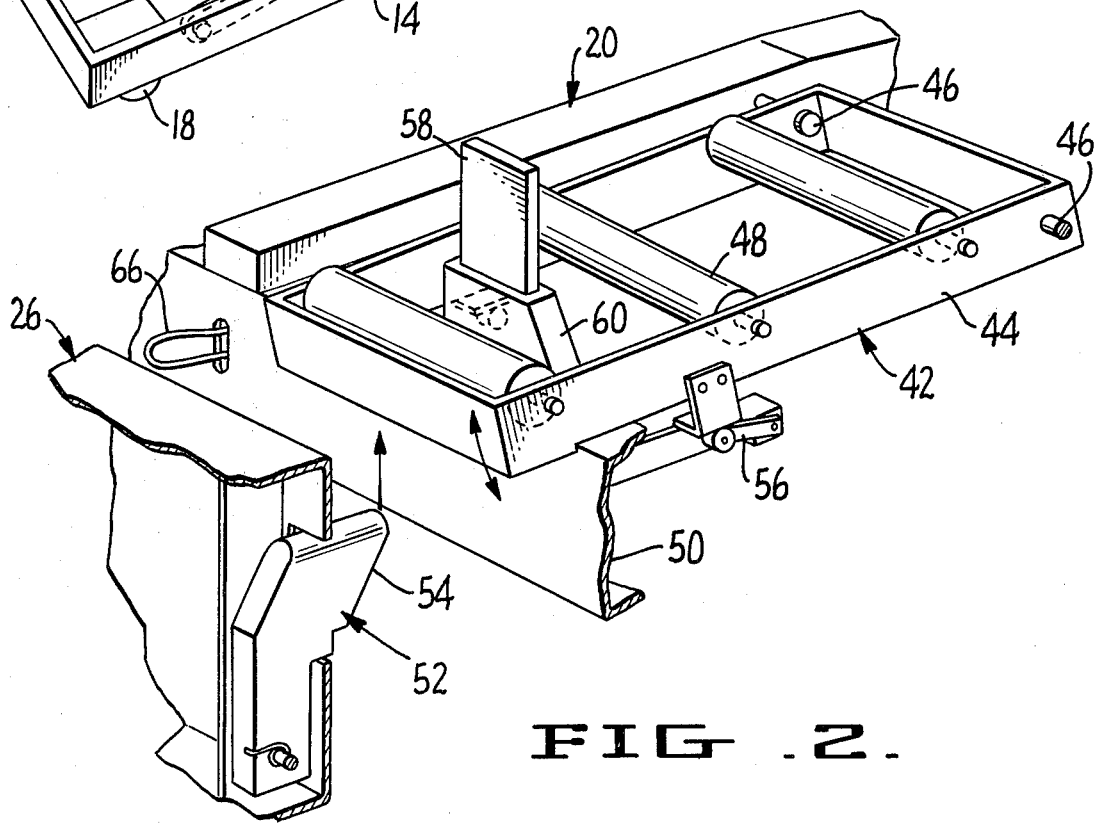

1

AIRCRAFT LOADER

BACKGROUND OF THE INVENTION

The freight handling vehicle of the invention is of the type which receives freight from a freight-handling vehicle and loads the freight onto an aircraft. It is of the multiple platform type comprising a forward bridge platform which is adapted to be connected to the aircraft at the cargo door and a rear, main elevator which is adapted to have its elevation matched to that of the bridge elevator as the latter moves up and down to maintain its position relative to the cargo door as the aircraft lowers during loading and raises during unloading.

With such two-platform loaders, a serious problem has been encountered in trying to match the transfer elevation of the forward bridge elevator and the rear elevator. Any misalignment between the levels of these two elevators makes the transfer of containers and pallets difficult. Such misalignment can result from level sensing switches which are out of adjustment, uneven ramp surfaces, heavy loads, or the adjustment of the rear wheels of the loader.

The essential object of the present invention is to provide means to ensure efficient load transfer between the two elevators even under such elevator-level misalignment conditions.

Multiple platform loaders of this general type are shown in U.S. Pat. Nos. 3,666,127 and 3,854,610. These patents are of general interest only and do not disclose any inter-elevator load transfer means of the type of that of the present invention.

SUMMARY OF THE INVENTION

According to the subject invention, individual transition trays are used as pivotal ramps to ensure the smooth flow of containers and pallets between platforms. These trays operate individually to provide exact alignment from side to side of the elevators. The trays are used to control the level of the rear platform and to match the levels of the two platforms.

Means are provided to enable the rear platform to move upwardly and downwardly past the trays without damage or interference.

The trays serve additional functions. They are employed to actuate pallet stops to prevent load transfer between elevators when the rear elevator and the trays are not adequately level-matched. The trays are also used to control upward movement and level of the rear elevator when it is moved upwardly to match the level of the front elevator and when it is moved downwardly to match the level of the front elevator.

BRIEF DESCRIPTION OF THE DRAWINGS

FIG. 1 is a view in perspective of an aircraft loader embodying the subject inventions.

FIG. 2 is an enlarged detail view in perspective of the front end of the rear elevator and the rear end of the front elevator.

DESCRIPTION OF THE PREFERRED EMBODIMENT

Figure 3:
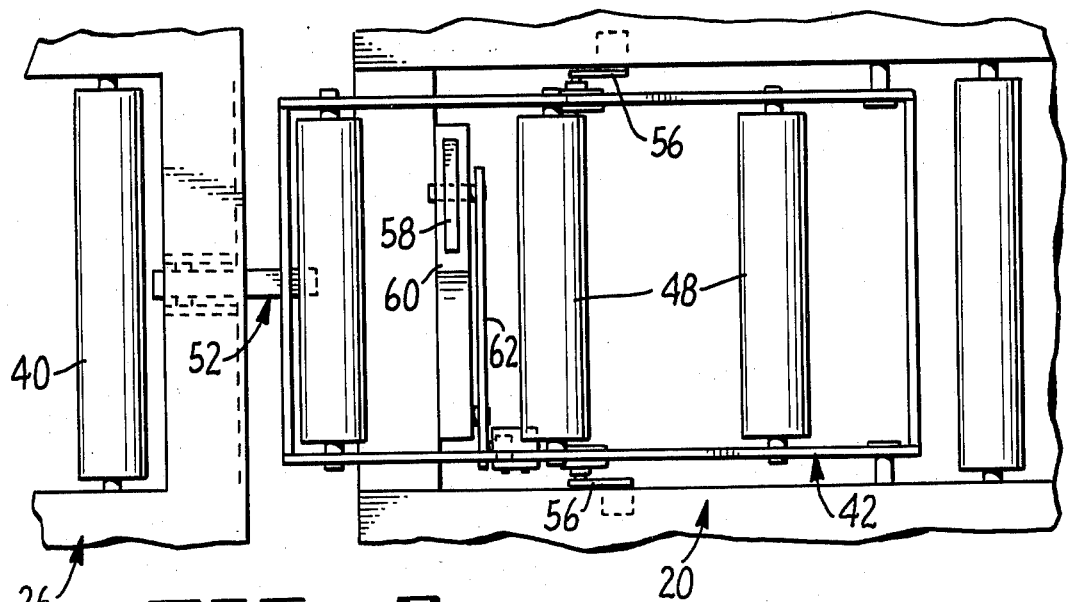
FIG. 3 is a top plan view of that portion of the loader shown in FIG. 2.

The loader comprises a vehicle 10 having interconnected forward and rearward frames 12 and 14 supported by front wheels 16 and rear wheels 18. A forward or bridge platform 20 is operably supported on forward frame 12 by scissors means 22 and power cylinders 24 interconnecting frame 12 and means 22.

Rear elevator 26 is operably connected to the rearward frame (the two frames 12 and 14 are integral) by scissors means 28, power cylinders 30, and chains 32, the latter being trained over sprockets carried by the cylinder rods and having their ends secured to frame 14 and platform 26. A scissors and cylinder lift system similar to 22, 24 is shown and described in detail in U.S. Pat. No. 3,854,610, while a scissors, cylinder and chain lift system like that of 28, 30, 32 is shown and described in U.S. Pat. No. 3,666,127.

Platform 20 is provided with power driven conveyor belts 34 and roller conveyors 36, while platform 26 is provided with power driven belt conveyors 38 and roller conveyors 40.

Three transition trays 42 are typically provided. The trays comprise box frames 44 attached by pivot pins to platform 20. The trays 42 carry conveyor rollers 48 and are adapted to engage and be supported by frame member 50 of platform 20.

The platform 26 is provided at its forward end with pivotally mounted, spring-urged tray actuator members 52, one for each of the trays 42. As shown in FIGS. 7–10, the actuators 52 enable the rear platform to be driven upwardly past the front platform and the trays and enable the rear platform to be driven downwardly (FIG. 10) past the trays. The actuators 52 are provided with camming surfaces 54 whereby the actuators 52 are yieldingly moved out of the way by the trays (FIG. 10) as the rear elevator or platform 26 is moved downwardly past the front elevator or platform 20 and the trays 42.

Figure 7:
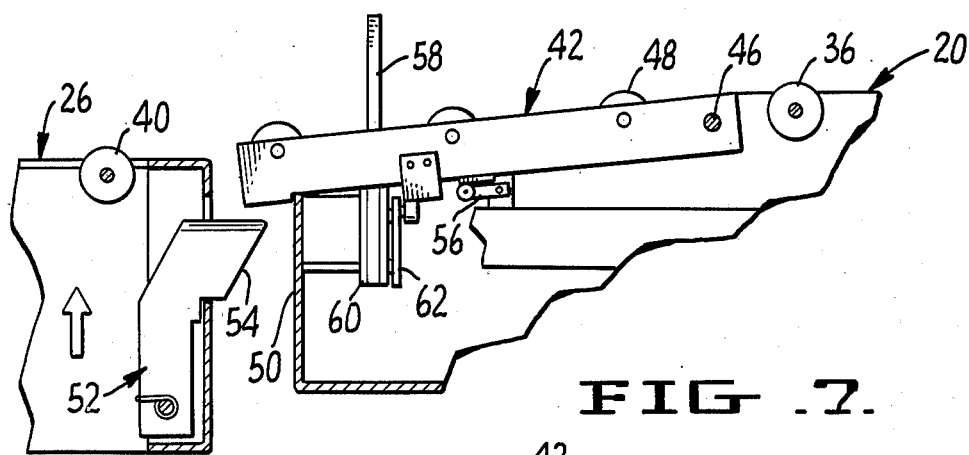
FIGS. 7–10 are views similar to that of FIG. 4 illustrating the cooperative relationship between the two elevators and the transition trays as the rear elevator is driven upwardly past the trays and downwardly past the trays.
Figure 8:
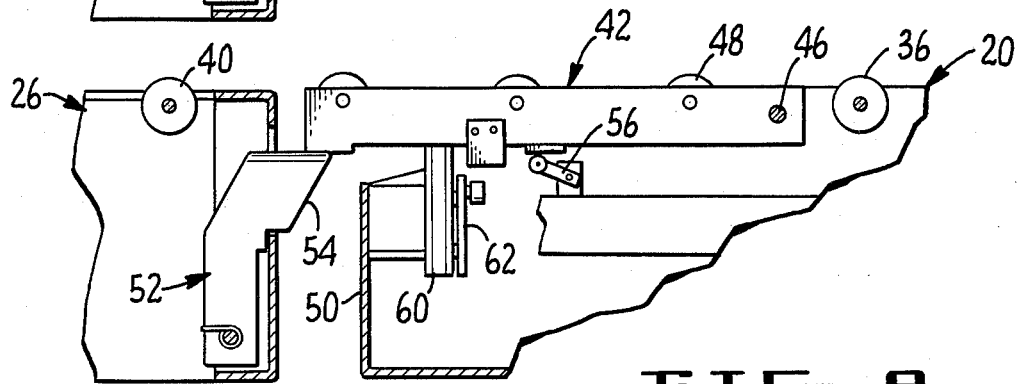

The normal load transferring condition of the machine is as shown in FIG. 8 in which the two platforms and the transition trays are disposed at the same level. When platform 20 moves upwardly relative to platform 26, as when the aircraft body moves upwardly under load-lightening and the operator actuates the platform drive means to move the platform upwardly accordingly, as shown in FIG. 7, the central tray depresses switch element 56 to cause the drive means 30, 32 to raise platform 26 to the point where the tray is out of engagement with switch element 56, the latter following upward movement of the tray to the point shown in FIG. 8, thereby de-energizing the platform drive means 30, 32 at a point where the two platforms and the trays are level with each other (FIG. 8). Similarly, when the aircraft body drops under loading and the platform 20 is powered downwardly accordingly under the control of the operator, the drive means 30, 32 for platform 26 is operated to once again bring the two platforms and trays to the level position of FIG. 8.

Figure 5:
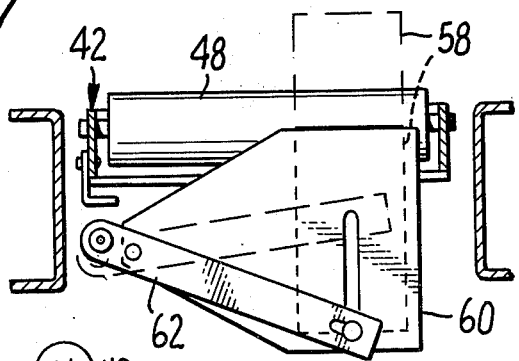
FIG. 5 is a view taken along lines 5—5 of FIG. 4.
Figure 6:
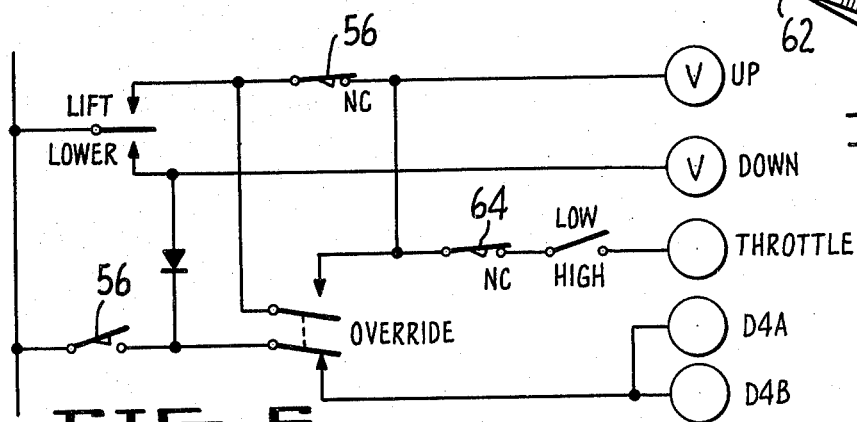
FIG. 6 is a schematic view of control circuitry for the elevators and trays.
Figure 10:
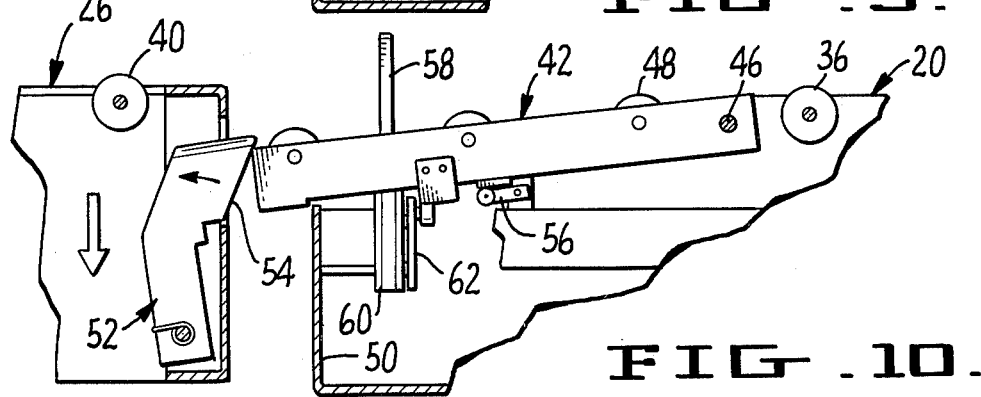

When the trays are in the downwardly inclined positions of FIGS. 7 and 10, plate members 58 extend upwardly through the trays 42 to block the transmission over the trays of load elements. Plate members 58 are normally downwardly retracted within housing envelopes 60 carried by platform 20. Plate members 58 are adapted to be projected upwardly into the blocking position by pivotal movement imparted to lever members 62 (FIG. 5) under the influence of movement of the trays to their downwardly inclined positions of FIGS. 7 and 10.

A pair of limit switches such as 56 are provided to control the driving action of platform 26 to normally maintain it level with the trays and the platform 20. One of these switches closes when the rear of the tray drops a predetermined degree, such as one-quarter of an inch, below the horizontal. This means that the rear platform 26 is the same distance below the level of the platform 20. Closing of the limit switch results in the driving upwardly of the rear platform to return the tray to level position, whereupon the switch contacts open. The other of the two limit switches is switched to a closed contact condition when the rear of the tray is disposed above horizontal a predetermined degree, such as one-quarter of an inch. This results in downward movement of the elevator 26 to restore the horizontal condition of the trays, whereupon the contacts of this latter switch open to terminate vertical movement of platform 26.

Figure 4:
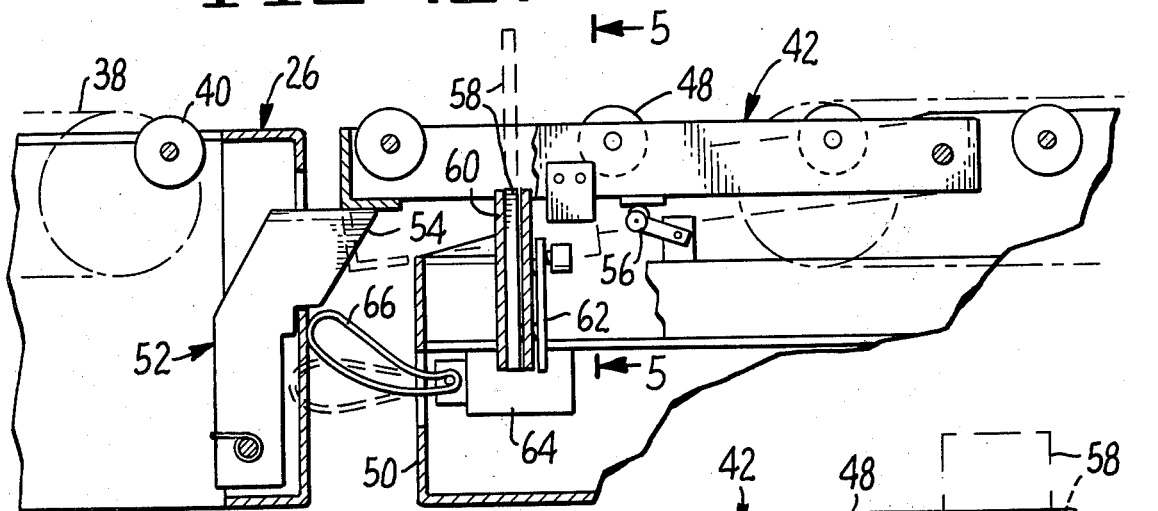
FIG. 4 is a view in side elevation of that portion of the loader shown in FIG. 3, parts thereof being shown in section.

A further control feature is provided by limit switch 64 (FIG. 4) which is provided with a flexible loop control element 66 which when engaged and actuated by platform 26, i.e. when it is in the solid line condition of FIG. 4, disengages an engine demand solenoid and thereby slows down the lifting speed of elevator 26.

The three individual transition trays 42 act as ramps to ensure the smooth flow of containers and pallets between platforms. The trays act individually to provide exact alignment from side to side. Each tray is picked up in the center by a single point actuator 52 which is rounded on the top. The front ends of the trays can twist to compensate for roll differences between platforms. The trays provide a smooth roller surface transition when the two platforms are within plus or minus two inches of each other.

Each of the trays 42 is adapted to actuate a separate pallet stop 58. The three stops 58 provide triple redundant operation to ensure that at least two of the three stops deploy if one is damaged.

Figure 9:
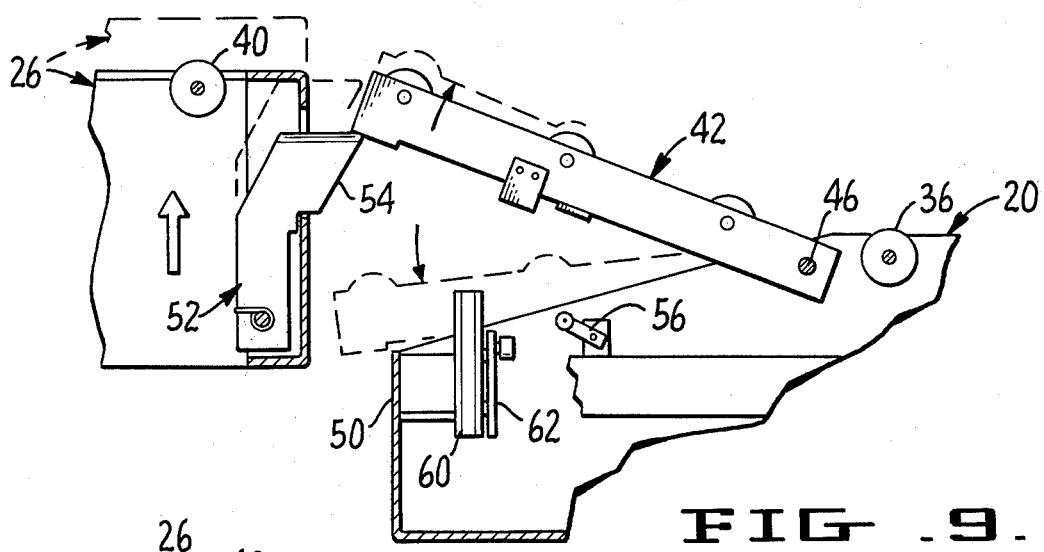

As indicated above, the trays 42 are free to rotate up out of the way during adapter operations when the elevator is required to pass the bridge. If the limit switch 56 controlling the up stop limit were to malfunction, and the elevator continued to lift, the actuators 52 will rotate the trays upwardly until they are free to drop back into position, as shown in FIG. 9. This prevents damage to the trays during such an electrical malfunction. On the other hand, if the elevator is lowered down onto the bridge, the spring urged actuators 52 are pushed back out of the way because of the slope of their surfaces 54.

What is claimed is:

1. A cargo handling vehicle for aircraft comprising a wheeled chassis, a main elevator and a bridge elevator supported thereby, power means for raising and lowering said elevators, a transition tray pivotally attached to the rearward end of said bridge elevator and constituting an extension section thereof, actuator means carried at the forward end of said main elevator adapted to pivotally raise and lower the rearward free end of said tray as said main elevator is raised and lowered, and means to control the operation of said power means for said main elevator to maintain said main elevator and tray substantially level with each other and with the bridge elevator as the bridge elevator is raised and lowered, said actuator means comprising an actuator member for said tray adapted to centrally engage the underside of the rearward free end of the tray and provide substantially a point support therefor.

2. The combination of claim 1, including a two-way vertically movable cargo stop member carried by one of said elevators for cargo-stopping projection and cargo-passing retraction, and control means for said stop member responsive to a predetermined amount of out of level movement of said tray to effect movement of said stop member to a projected cargo-stopping position.

3. The combination of claim 1, said tray actuating member having a camming surface and being carried for yieldingly pivotal movement whereby the main elevator may be moved from a level above to a level below the bridge elevator and tray.

4. A cargo handling vehicle for aircraft comprising a wheeled chassis, a main elevator and a bridge elevator supported thereby, power means for raising and lowering said elevators, a plurality of laterally spaced transition trays pivotally attached to the rearward end of said bridge elevator and constituting extension sections thereof, cargo conveyor means carried by said elevators and trays, actuator means carried at the forward end of said main elevator adapted to pivotally raise and lower the rearward free ends of said trays as said main elevator is raised and lowered, and means to control the operation of said power means for said main elevator to maintain said main elevator and trays substantially level with each other and with the bridge elevator as the bridge elevator is raised and lowered, said actuator means comprising an actuator member for each tray adapted to centrally engage the underside of the rearward free end of the tray and provide substantially a point support therefor so as not to prevent twisting movement of said trays to compensate for roll differences beween said elevators.

* * * * *